April 9, 1963 E. E. FERRIS 3,084,747
LAND CLEARING APPARATUS
Filed Aug. 10, 1959 2 Sheets-Sheet 1
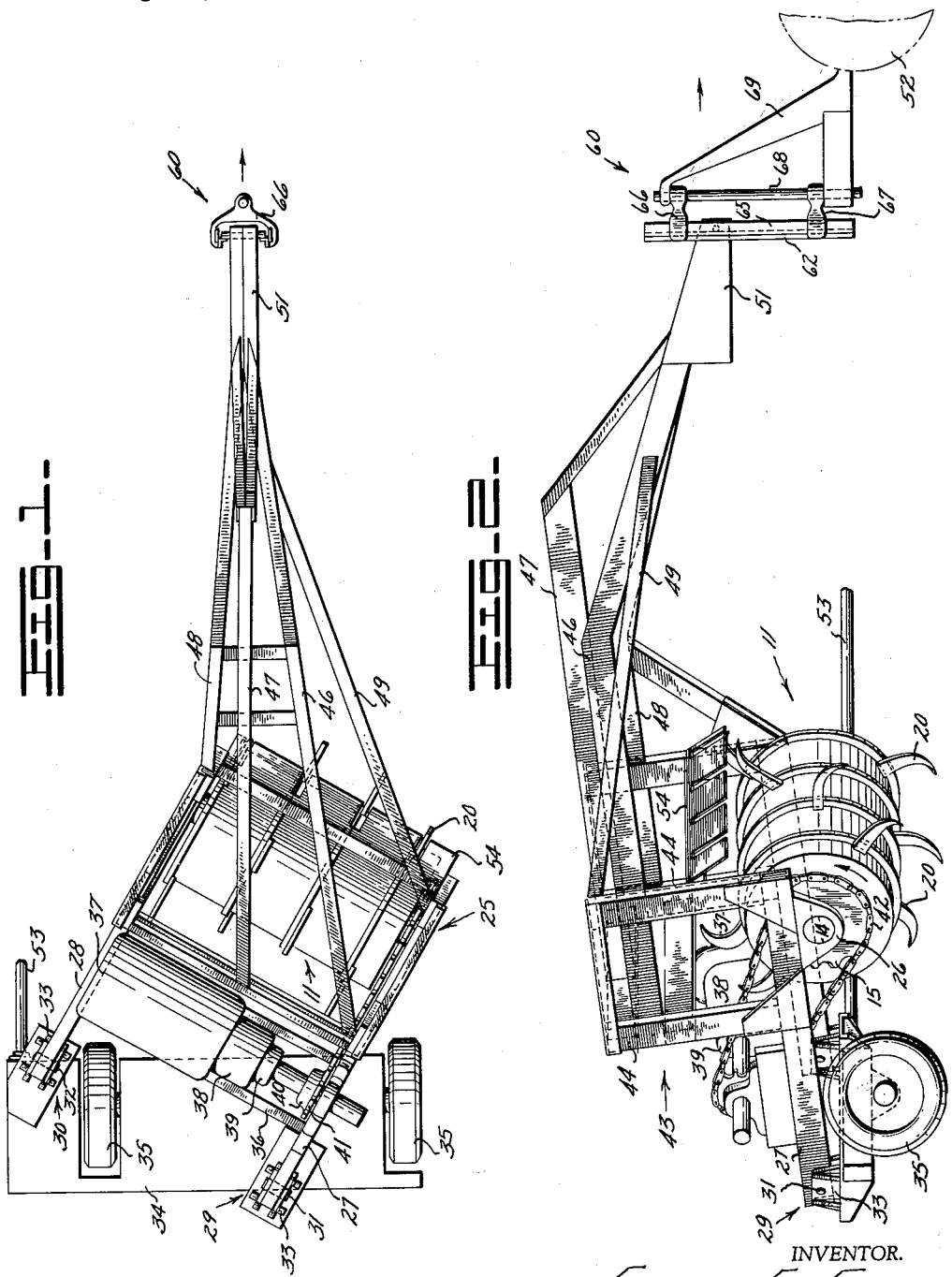
INVENTOR.
EDWARD E. FERRIS
BY
Miller, Morris & Pappas
ATTORNEYS

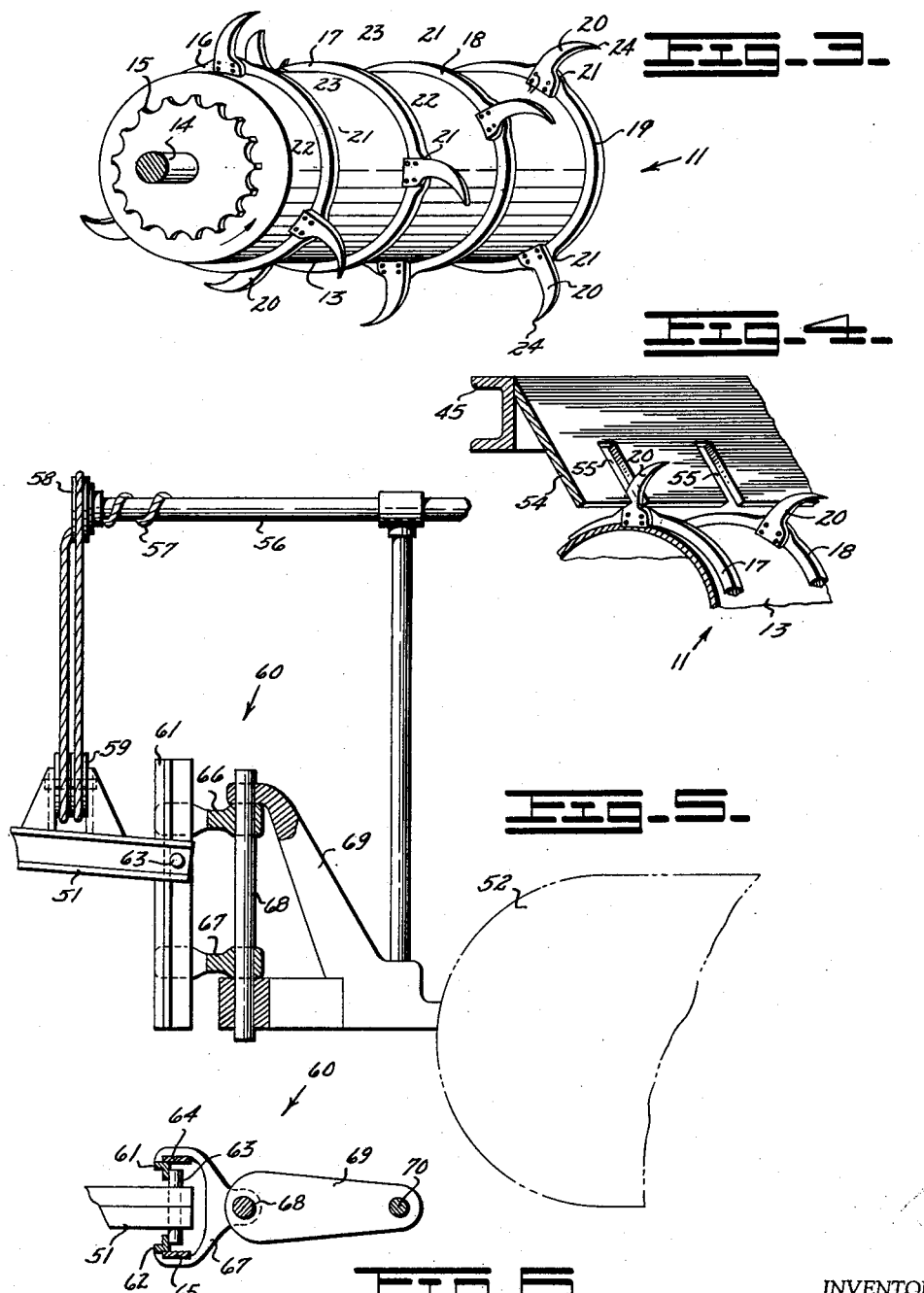

3,084,747
LAND CLEARING APPARATUS
Edward E. Ferris, 1119 E. Ash, Mason, Mich.
Filed Aug. 10, 1959, Ser. No. 832,513
3 Claims. (Cl. 172—39)

The present invention relates to a land clearing apparatus and more particularly to a drum structure which digs beneath the surface of the earth to be cleared to root up roots, tendrils, and organic debris and then withdraws the debric for subsequent burning or removal. Still more particularly, the device of the present invention comprises a driven drum canted obliquely from the forward direction of travel of the drum, and wherein the driven drum rotates in a direction contra to the general direction of forward movement. The drum is provided with curved blades, that curve radially outward from the drum face and opposite to the direction of drum rotation. As will be appreciated the driven drum plunges the teeth into the earth so as to withdraw any matted roots and other organic debric without "hooking." As the rotation of the drum continues the teeth can then be freed of any clinging debris or earth.

Land clearing heretofore has been primarily accomplished by bulldozers, plows, rakes, and harrows or combinations of all of these devices to remove plant life, subsurface and surface debris, stones, stumps, and litter. Cleaning, thus accomplished has been slow, generally incomplete, and wholly unsatisfactory for example in heavy palmetto growth as encountered in Florida and like semi-tropical areas. Root rake attachments for bulldozers tend to remove top soil as well as roots and requires intermittent backward and forward motion for repeated bites. Some devices such as the device described and claimed in United States Letters Patent 2,691,927 have employed combinations of powered drums which simply chop or break the debris requiring subsequent independent removal means or the growth reappears because the roots are not removed. People engaged in extensive land clearing operations have therefore long sought a device which would satisfactorily grub out roots and the like while maintaining substantial speed and efficiency and wherein the use of rakes, harrows, and the like could be substantially avoided. The hereinafter described device has answered that need and in testing through dense palmetto growth has cleared ½ acre of land in thirty-five minutes leaving the organic debris in neat windrows for burning or other disposition. Trees up to four inch diameter were successfully grubbed out along with shallow bedded stumps, rock, and other rubble. Observation of land thus clear evidenced a very complete removal of roots inasmuch as regrowth patterns required reseeding, the major land plant life having been successfully removed. The forward movement of the device of the present invention moved through the indicated growth at speeds between 1.5 and 3 miles per hour, the drum rotating at an average 69 revolutions per minute and capable of a range between about 30 revolutions per minute and 120 revolutions per minute. The drum employed on the tested apparatus was about 4 feet in diameter with teeth approximately 10 inches long from base to tip. The windrows formed were very neat and the action of the teeth on the drum shook free substantially all of the topsoil and by reason of the tooth curvature, opposite from the direction of drum rotation, the debris sticking to the teeth was very easily dislodged, thereby avoiding operational jamming or clogging which has been troublesome to all forms of devices proposed for grubbing work. The device, working continuously, as opposed to intermittently used devices, left the ground in smoothed, well tilled condition.

Accordingly the principal object of the present invention is the provision of a land clearing machine capable of continuous grubbing operation.

Another object is to provide a land clearing structure wherein the teeth are substantially self-cleaning.

Another object is to provide a land grubbing structure which clears the debris into neat windrows.

Still another object is to provide a driven drum grubbing structure wherein the form of the teeth and the orientation of the teeth supplement the windrowing effect and operating at an angle deviating from the direction of machine movement, are highly efficient in root and debris removal.

Other objects including adjustability, stabilization of structure, rugged durability, and simplicity and economy of service and manufacture will be increasingly apparent to those familiar with clearing problems and equipment as the description proceeds.

In the drawing:

FIGURE 1 is a top plan view of the land clearing structure and illustrates that the frame pivots mounted on the carriage are on a common axis and in spaced apart relation and the common axis of the pivots are parallel to the drum pivots. In addition the drawbar members are indicated as extending to the prime mover.

FIGURE 2 is a side elevation view of the entire machine of the present invention, as shown in FIGURE 1 showing the canted drum, the carriage arrangement, frame, and frame pivot location as well as the preferred chain drive and frame mounted drum driving mootr.

FIGURE 3 is a perspective view of the power driven drum illustrating the curvature of the teeth, the positioning of the teeth in respect to the drum and the preferred attachment means securing teeth to drum.

FIGURE 4 is a perspecive view of the tooth combing indicating how debris is removed from the teeth during rotation and slipped off of the tips of the teeth by a comb plate having slots therein and extending downward and substantially tangential to the drum. The direction of drum rotation is indicated.

FIGURE 5 is a partial side elevation view of the tow bar hitch arrangement as secured to the prime mover wherein the draw bar may be elevated or depressed and the pintle permits relative rotational movement with respect to the clearing device and prime mover.

FIGURE 6 is a partial top plan view of the draw bar illustrating the draw bar pin riding against the vertical angles, the whole pivotal on the indicated pintle and showing the sheave mounting for raising and lowering the draw bar as desired.

General Description

In general a drum is provided for rotation in a frame, both drum and frame being cocked so as to be oblique to the line of frame and drum forward travel. The drum is powered so as to be rotated in a direction opposite from the direction of lineal forward movement. The teeth extending radially from the drum face are curved oppositely from the direction of rotation as considered from the base of the teeth to the tip of the teeth. The drum, thus formed is journalled in the frame. Power for driving the drum is also mounted on the frame and intermediate the drum and power source an overload clutch prevents damage to the teeth or motor upon large obstacle engagement. The frame extends rearwardly and connects to the upper surface of a wheeled carriage. The connection is pivotal and the common axis of the pivots extends diagonally across the carriage platform. The axis of the wheels of the carriage is transverse of the line of carriage movement. A superstructure is provided for the frame. The superstructure also provides tow bar extensions and structural reinforcement of the frame. The superstructure also provides mounting means for a combing device which strips debris from the machine teeth. The tow bar is connected to a connecting or hitch device permitting the tow bar and connected frame to be raised or lowered on the carriage mounted pivots thereby adjusting the drum to depth of earth penetration. A prime mover is connected to the tow bar which pulls the entire apparatus along over ground to be cleared.

The drum, in its rotation contra to the line of pulling or direction of movement, resists the forward movement as the blades enter the earth, the convex side of the curved blade working upwardly in its rotating plane but being simultaneously moved forward by the prime mover. Relative to obstacles in the earth this provides an upward pressure under obstacles with a compound forward impetus or drive. Adjacent teeth also assist in the rooting up of long and continuous roots which either fall free of the teeth along the arc of rotational movement or are combed therefrom by action of the slotted plates stripping the teeth. The canting of the drum from the line of travel results in neat windrows of debris for subsequent removal or burning. The tow bar upon elevation or depression pivots the frame on the wheeled carriage thereby adjusting the depth of cut. One pass of the device over fairly heavy brush or vegetated earth is usually sufficient.

Specific Description

With particular reference to FIGURE 3, the drum 11 is made up of disc-like end closures 12 around which the drum sheath 13 is wrapped and welded. The end closures 12 are also fixed to a shaft 14 axially through the drum 11. Over the shaft 14 is a sprocket 15 secured to the shaft. Rings or bands 16, 17, 18 and 19 provide annular raised and spaced apart mounting means for the teeth 20 as will be seen. The rings or bands 16, 17, 18 and 19 are welded or otherwise secured to the drum 11. Mounting stubs 21 extend radially from the bands 16, 17, 18 and 19 at approximate 120 degree intervals. These stubs 21 permit the removal and replacement of teeth 20 as by bolts 22. The teeth 20 are curved or crescent shaped in a direction opposite to the direction of rotation of the drum 11. Thus, the leading edge 23 of the teeth 20 is convex in shape. The tip 24 of the teeth 20 is curved away from ground engagement. The teeth 20 in adjacent bands across the face of the drum 11 are oriented so that each band 16, 17, 18 and 19 is about 22½ degrees rotated from the adjacent band so as to provide a plural spiral arrangement complete across the face of the drum 11. It will be appreciated that the angular spacing of the teeth 20 may be varied in accord with the number of bands employed and the size of the drum used. The specific unit described had a drum diameter of about 4 feet and utilized 4 bands 16, 17, 18 and 19 as shown with 3 teeth 20 per band.

Referring to FIGURES 1 and 2, the drum is mounted in a frame 25, the frame 25 carrying bearing means 26 which journal the shaft 14 at either end. The main elements 27 and 28 of the frame 25 extend rearwardly and are spaced in parallel relationship to pivots 29 and 30 established by passing pins 31 and 32 through the ends of the elements 27 and 28 and through bracket mounts 33, as shown. This arrangement as indicated places the pivots 29 and 30 on a common axis parallel to the axis of drum 11. The bracket mounts 33 establishing the position of the frame 25 are secured to a carriage 34. The carriage 34 is provided with wheels 35, preferably of the pneumatic type and the axis of the pivots 29 and 30 is oblique to the axis of the carriage 34 as established through the wheel centers. This mounting is thus oblique from the direction of carriage travel and establishes a canting of the drum 11 from the normal expected movement of the carriage 34. A motor mount 36 is provided transversely between the elements 27 and 28 of the frame 25. The motor 37 is secured thereto and is connected to a clutch 38 and gear reducer 39. The output shaft from the gear reducer 39 is served by an overload clutch 40. The motor 37 thereby drives a sprocket 41. The sprocket 41 is in line with the sprocket 15 secured to the drum 11. A drive chain 42 over the sprockets 15 and 41 assures rotation of the drum 11 in a direction opposed to the direction of travel of the entire apparatus except when an obstacle is encountered requiring power in excess of the setting of the overload clutch 40. In such an instance the drum 11 rotates substantially in the direction with the line of travel of the apparatus 42 until the teeth 20 are freed from the obstacles. Then power driving of the drum 11 is resumed.

A superstructure 43 is provided in connection with the frame 25 which substantially bridges the drum 11. This is made up of corner posts 44 and cross pieces 45 tying the superstructure 43 together. From the upper portion of the superstructure 43 tow bar members 46, 47 and 48, and bracing members 49, and 50 extend outwardly and convergingly to provide a tow bar 51. The tow bar 51 is adapted for attachment to a selected prime mover, such as a tractor 52. In use it has also been found desirable to employ a stabilizing rod 53 secured at one end to the carriage 34 and at the other end to the prime mover 52. This stabilizes the apparatus 42 from any tendency to tilt during operation through rugged terrain. Transverse of the frame 25 and secured to selected cross pieces 45 of the superstructure 43 is a slotted plate 54 best shown in FIGURE 4, the slots 55 being in alignment with each of the band sets of teeth 20 on the drum 11. As the teeth 20 pass through the slots 55 they are combed clear of debris, the curvature of the tooth tips 24 allowing the debris to easily fall clear avoiding hang-up.

Referring to FIGURES 5 and 6 it will be appreciated that the drum 11 is adjustable by means of varying the elevation of the towbar 51 during movement by the prime mover 52. While this elevation may be acomplished by electric, pneumatic and hydraulic means, the mechanical means illustrated has proved very adaptable to prime movers supplied with power take-off means. An overhead shaft 56 is provided having a cable 57 secured thereto for wind-up. The cable 57 is then passed over sheaves 58 and 59, the sheave 58 in free rotation on the shaft or boom 56 and the sheave 59 being secured for rotation to the tow bar 51. Energization of the power take-off is thus caused to raise or lower the tow bar 51 in the hitch element 60. The hitch element 60 comprises a pair of spaced apart angle members 61 and 62. The tow bar 51 passes through the space and by means of tow pin 63 transversely therethough is secured against removal while the pin 63 is allowed to roll on the backs of the legs of angles 61 and 62. The pin 63 is retained against lateral fall out by the removable plates 64 and 65 extending from the legs of the angles 61 and 62. The angles 61 and 62 are secured in spaced apart relation by the yoke members 66 and 67, as shown, which provide running clearance for the tow bar 51 and pin 63 and are themselves secured in line relationship by the vertical pin or shaft 68 passing therethrough. The hitch is completed by a hitch chassis member 69 journalled on the vertical shaft 68 and extending to pintle lock engagement at the draw bar 70 of the prime mover 52. The hitch permits pivotal flexibility for relatively sharp turning.

Operation

In operation the driven drum 11 with its teeth 20 rotating to oppose the forward motion of the entire apparatus causes the teeth 20 to penetrate beneath roots and tendrils below the ground surface and lift them or rip them out of the ground carried upward by the teeth 20. The canting of the drum 11 from the direction of travel causes the debris to be delivered sideways from the drum 11 in a neat windrow. The spiral presentation of the teeth 20 across the face of the drum 11 assists in the windrowing and substantially assists in the de-rooting operation in avoidance of a breaking up of long continuous root structure. This is by reason of the lift sequencing resulting from the indicated tooth spacing. In addition, the teeth 20 do not tend to foul since the debris falls free of the downcurved tips 24 by action of gravity. The slotted comb plate 54 renders the cleaning of the teeth 20 positive. As indicated, the apparatus is easily adjusted as to desired amount of ground contact by the tilting of the frame 25 on the carriage 34. Quite dense palmetto land including popple trees up to about 4 inches in diameter were successfully cleared at a rate of about ½ acre in 35 minutes using the structure herein described.

It is contemplated that larger devices embodying the same features can do better.

While the description has faithfully presented the machine as used it will be appreciated that certain obvious modifications can be made without departure from the spirit of the invention. For example, the prime mover may be made integral with the frame, although the advantage of detachability is to free the prime mover for other use. Variant specific means may be employed to elevation and depression of the drum 11, and of course the frame form could be modified to meet specific conditions.

These and other modifications will be apparent to those skilled in the art and such contributions are intended to be included in the invention herein expressed limited only by the scope of the hereinafter appended claims.

I claim:

1. In a land clearing apparatus, the combination comprising a wheeled carriage, primarily adapted to be driven in a forward direction; a frame pivotally connected at one end to said carriage, the pivotal axis of said connection forming an oblique angle with the axis of said carriage wheels, said frame extending forwardly of the carriage; a superstructure mounted on and extending above said frame; rigid tow bar means extending forwardly from the upper portion of said superstructure; a drum journalled in the forward end of said frame and adapted to be driven in a direction substantially opposite from the lineal direction of movement of said carriage; teeth secured at their bases to said drum in a spiral pattern across the face of said drum, each tooth being of a curved shape with the tip following the base in the direction of drum rotation; rigid comb means mounted on said superstructure above and ahead of said carriage and forwardly of the drum axis, and being so positioned that it slopes downwardly away from the carriage, said comb being in an interference path with the teeth on said drum thereby cleaning the teeth as the drum rotates.

2. The structure as set forth in claim 1 wherein the tow bar means is provided at its forward end with an elevation adjustment hitch connection whereby said drum may be raised or lowered.

3. The structure as set forth in claim 1 in which the drum is driven by an independent power means mounted on said frame.

References Cited in the file of this patent

UNITED STATES PATENTS

| | | |
|---|---|---|
| 879,543 | Herberg | Feb. 18, 1908 |
| 1,145,282 | Warren | July 6, 1915 |
| 1,186,375 | Burrows | June 6, 1916 |
| 1,745,903 | Millar | Feb. 4, 1930 |
| 1,807,150 | Caldwell | May 26, 1931 |
| 2,509,463 | Wade | May 30, 1950 |
| 2,618,921 | Riley et al. | Nov. 25, 1952 |
| 2,657,620 | Meeks | Nov. 3, 1953 |